June 23, 1953     J. P. TYSKEWICZ     2,642,949

SEPARATOR FOR STEAM, WATER, AND SCALE

Filed May 25, 1951     2 Sheets-Sheet 1

John P. Tyskewicz
*Inventor* by Edward C. Taylor
*Attorney*

June 23, 1953  J. P. TYSKEWICZ  2,642,949
SEPARATOR FOR STEAM, WATER, AND SCALE
Filed May 25, 1951  2 Sheets-Sheet 2
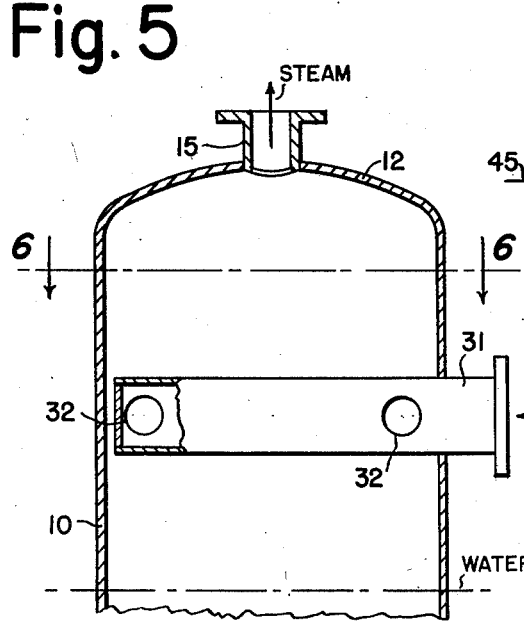
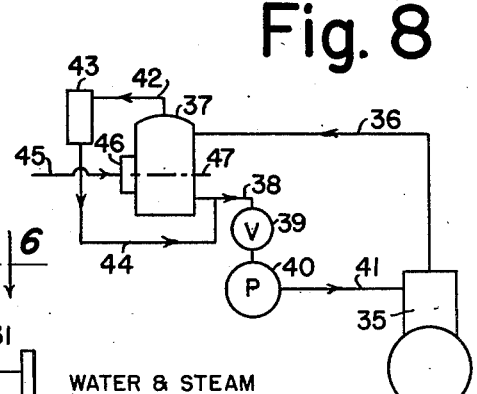
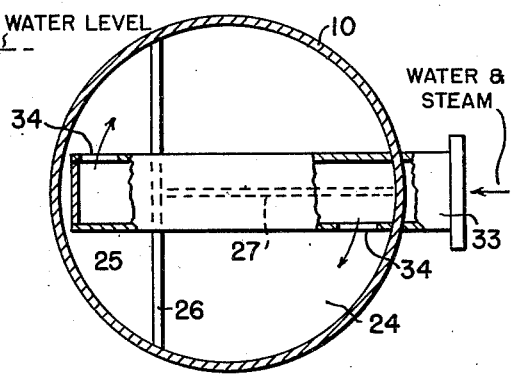
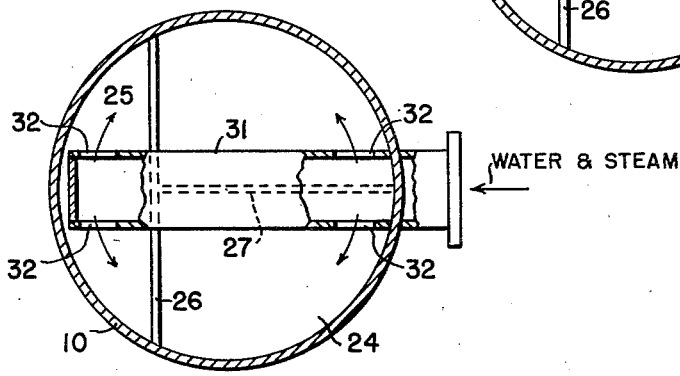
John P. Tyskewicz
Inventor
by Edward C. Taylor
Attorney Patented June 23, 1953

2,642,949

UNITED STATES PATENT OFFICE 2,642,949

SEPARATOR FOR STEAM, WATER, AND SCALE

John P. Tyskewicz, Hartford, Conn., assignor to The Maxim Silencer Company, Hartford, Conn., a corporation of Connecticut Application May 25, 1951, Serial No. 228,243

13 Claims. (Cl. 183—2.5)

This invention relates to separators for water and steam, particularly intended for use with water of a type causing the formation of scale within the separator. Scale formation can be a serious hazard, for example, in the successful operation of a high temperature cooling system for internal combustion engines. In such a system the rate of circulation of the cooling water is so regulated that part of the water flashes into steam upon entering the separator. The separated steam is led off to a condenser, and the separated water, along with water resulting from condensation of the steam, is returned to the cooling jacket of the engine by a pump. Scale formed within the separator will in time flake off, and if it is allowed to return to the cooling system will cause trouble in the pump or elsewhere. It is the object of the invention to produce a high degree of separation of steam and water even under the severe conditions accompanying flashing, and to prevent the carrying back of loose scale into the cooling system.

The invention will now be described with reference to the accompanying drawings, in which Fig. 1 is a view in median section, taken on line 1—1 of Fig. 2, of the separator in its preferred form;

Fig. 5 is a fragmentary section similar to Fig. 1 but showing a further modification;

Fig. 6 is a section on line 6—6 of Fig. 5;

Fig. 7 is a section similar to Fig. 6 but showing a further modification; and

Fig. 8 is a diagram showing one environment in which the separator may be used.

Figure 1:
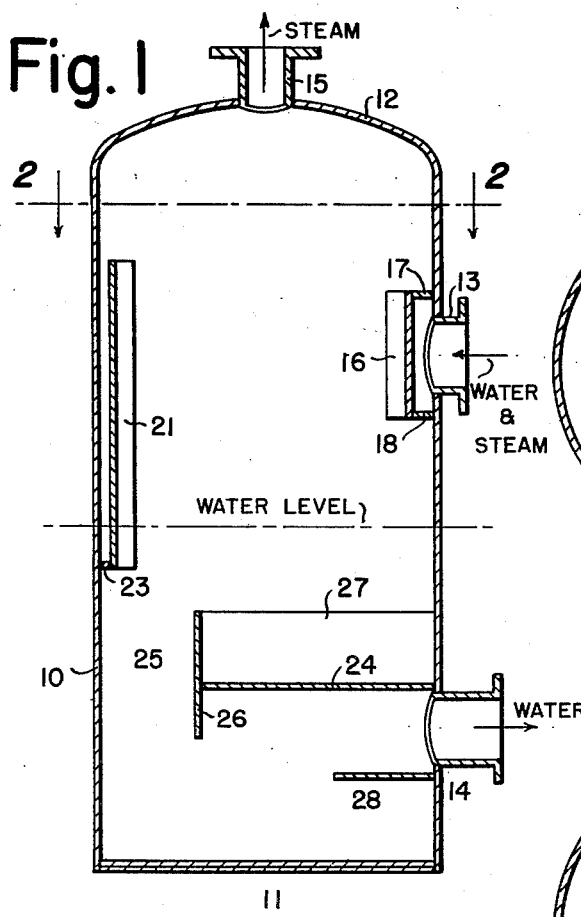
Figure 2:
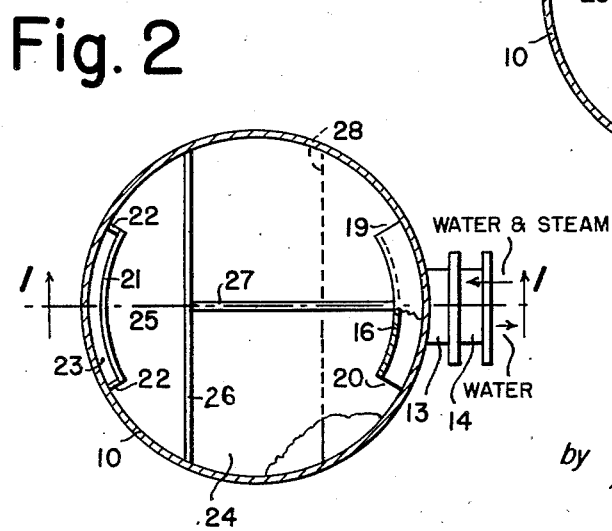
Fig. 2 is a section on line 2—2 of Fig. 1.

Referring first to the preferred form shown in Figs. 1 and 2, the separator has a shell 10 having a bottom header 11 and a top header 12. A side inlet 13 for water and steam enters the shell at one side above the water level at which the device is intended to operate. In order to avoid flashing of water into steam in the suction pump which circulates the water through the engine jacket the separator should be operated with a substantial depth of quiescent water above the water outlet 14 and the suction pump should be operable at as great a distance below the separator as the installation permits. The depth of water in the separator is controlled by the amount of water in the engine cooling system, which is substantially closed, and by the rate of circulation. Some provision for adding make-up water is generally present in the cooling system, as will be described, but for present purposes it is sufficient to consider simply that the separator has a normal water level as shown in the drawings. Whirling of water in this quiescent pool is undesirable even though the water may initially have been given a whirling motion in the upper part of the chamber to separate it from the steam which passes out through the top central outlet 15, and several ways of rendering the pool quiescent will be described.

As the water and steam enter the separator through the inlet 13 separation is accomplished mainly by directing the water into contact with the inner wall of the shell 10 and preventing it from getting out into the center of the separator chamber. For this purpose a curved baffle plate 16 is spaced away from the shell wall by upper and lower closures 17 and 18. In this way the water must pass through the oppositely directed nozzles 19 and 20, which are bounded by the shell wall, the baffle plate, and the upper and lower closures, and comes at once into intimate contact with the inner surface of the shell. It is slowed down rapidly and loses its initial tendency to break up and be carried away by the steam as well as the tendency to disturb the water in the quiescent pool below.

If the entering velocity is great enough the two streams of water may meet at a point diametrically opposite the entrance and cause splashing. To prevent this a curved baffle plate 21 is spaced from the sides of the shell by corner lugs 22 and is provided with a bottom closure 23 positioned below the water line. This prevents the two streams from splashing out into the interior of the separator and also prevents the descending water from causing agitation of the relatively quiet water in the pool.

Positioned completely below the water line and just above the water outlet 14 is a horizontal segmental baffle 24 which extends partway across the interior of the shell 10, leaving beyond it a passage 25 which is made large, as shown, so that water descending to reach the outlet will be kept at a low velocity. To the chordal edge of baffle 24 is secured a vertical plate 26 extending above the baffle to form a pocket and below it to direct descending water downwardly and away from the outlet 14. The purpose of the pocket is to catch any scale that may have formed on the wall of the separator above it and then broken off, and prevent it from being carried back into the cooling system of the engine. A vertical anti-whirl vane 27 connects the plate 26 with the shell wall above the water outlet to cut down any tendency of the water in the pool to swirl, and to decrease motion of the water in the pocket which might cause scale to be thrown out. A segmental baffle 28 (which can conveniently be the remainder of a complete circle from which the baffle 24 was cut) is secured to the shell wall below the water outlet to prevent scale which has passed down through the passage 25 from being carried upwardly into the water outlet.

Figure 3:
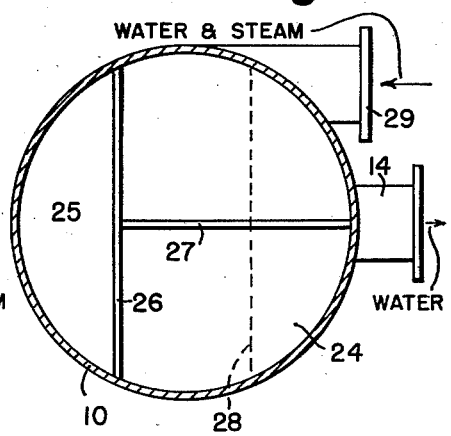
Fig. 3 is a view similar to Fig. 2 but showing a modified form of water and steam intake.
Figure 4:
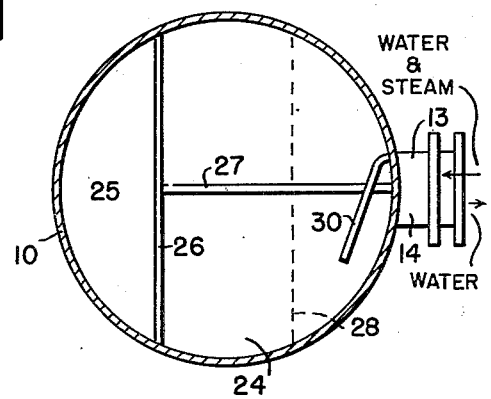
Fig. 4 is a similar view showing another modification.

The utility of the construction described in the last paragraph is not dependent on the exact form of the water and steam inlet into the upper part of the separator. Thus in Fig. 3 the water and steam inlet enters tangentially, being thus held against the wall of the separator by centrifugal action. Whirling in the pool below is prevented by the plate 26 and the vane 27. The form shown in Fig. 4 is similar except that the whirling action is directed by a plate 30 secured to the shell wall at one side of the water and steam inlet and curved across it in spaced relation to the shell. There being but one stream of water in each of these cases the baffle 21 is not needed.

In Figs. 5 and 6 a still different form of steam and water inlet is used. Instead of terminating at the shell wall the inlet conduit 31 extends diametrically across it, with side openings 32 at each end located on both sides of the conduit. In this way the entering stream is divided into four, so that the velocity is reduced and intimate contact with the shell wall is assured. In Fig. 7 the conduit 33 is provided with a hole 34 near each end; but these are located on opposite sides of the conduit so that a whirling action is induced in the upper part of the separator. While in this case there are only two streams their direction is the same so that they do not tend to splash against each other.

In Fig. 8 there is shown one environment in which the separator may be used, as described generally above. The jacket 35 of an internal combustion engine is connected by a conduit 36 with the upper part of the separator 37 in any of the ways described above. The cooling water in the jacket leaves it at a temperature which is at or above the boiling point. Since it is not much above that point, however, it does not all flash into steam on release, and what arrives at the separator is a mixture of water and steam. The water portion is taken from the separator through a valve 39 and a pump 40 to be returned to the jacket 35 through a conduit 41. Steam separated from the water in the separator 37 is led through a conduit 42, through a condenser 43 of any suitable type, and back to the conduit 38 through a pipe 44. In general this sort of system is self-sustaining, but in case of possible losses of water during operation it is desirable to have a line 45 from any source of make-up water supply pass through a constant level system 46 to keep the level in the separator chamber at the line marked 47.

What I claim is:

1. A water, steam, and scale separator for use in a water circulating system which includes supply means adapted to maintain water within the system and a column of water at a preselected level within the separator, said separator comprising a substantially vertically disposed cylindrical shell which is closed at both ends, an inlet conduit extending into the upper portion of the shell above the water level therein and with its opening into the shell directed along the inside of a cylindrical wall of the shell, a steam outlet at the top of the shell, a water outlet extending from the lower portion of the shell below the water level, a horizontal segmental baffle plate secured to the inside of the shell wall adjacent the upper edge of the water outlet and below the water level, and a vertical plate secured to the chordal edge of the segmental plate and forming with it a pocket to collect scale.

2. A water, steam and scale separator for use in a water circulating system which includes supply means adapted to maintain water within the system and a column of water within the separator at a preselected level, said separator comprising a substantially vertically disposed cylindrical shell which is closed at both ends, an inlet conduit for water and steam extending into the upper portion of the shell above the water level therein and with its opening directed along the inside of the cylindrical wall of the shell, a steam outlet at the top of the shell, a water outlet extending from the lower portion of the shell well below the water level therein, a substantially horizontal segmental baffle plate secured to the inside of the shell adjacent the upper edge of the water outlet and beneath the water level, a substantially vertical plate secured to the chordal edge of the segmental plate and forming with it a pocket to collect scale, and at least one substantially vertically disposed anti-whirl vane in said pocket.

3. A water, steam and scale separator for use in a water circulating system which includes supply means adapted to maintain water within the system and a column of water within the separator at a preselected level, said separator comprising a substantially vertically disposed cylindrical shell which is closed at both ends, an inlet conduit for water and steam extending into the upper portion of said shell above the water level therein and with its opening directed along the inside of the cylindrical wall of the shell, a steam outlet at the top of the shell, a water outlet extending from the lower portion of said shell and below the water level therein; a substantially horizontally disposed segmental baffle plate secured to the inside of the shell wall adjacent the upper edge of the water outlet and beneath the water level, a substantially vertical plate secured to the chordal edge of said segmental baffle to form a scale collecting pocket therewith, and a second substantially horizontally disposed segmental baffle plate secured to said shell adjacent the lower edge of said water outlet.

4. A water, steam and scale separator for use in a water circulating system which includes supply means adapted to maintain water within the system and a column of water within the separator at a preselected level, said separator comprising a substantially vertically disposed cylindrical shell which is closed at both ends, an inlet conduit for water and steam extending into the upper portion of said shell above the water level therein and with its opening directed along the inside of the cylindrical wall of the shell, a steam outlet at the top of the shell, a water outlet extending from the lower portion of the shell well below the water level therein, a substantially horizontally disposed segmental baffle plate secured to the inside of the shell wall adjacent the upper edge of said water outlet and well below the water level, a substantially vertically disposed plate secured to the chordal edge of said segmental plate and forming a scale collecting pocket therewith, a second substantially horizontally disposed segmental baffle plate secured to said shell adjacent the lower edge of said water outlet, and at least one substantially vertically disposed anti-whirl vane in said pocket.

5. A water, steam and scale separator for use in a water circulating system which includes supply means adapted to maintain water within the system and a column of water within the separator at a preselected level, said separator comprising a substantially vertically disposed cylindrical shell which is closed at both ends, an inlet conduit for water and steam extending into the upper portion of said shell above the water level therein, a curved baffle plate spaced from the inside of the cylindrical wall of the shell and extending across the end of said inlet conduit to direct the water along the inside of the shell wall, a steam outlet at the top of the shell, a water outlet extending from the lower portion of the shell well below the water level therein, a substantially horizontally disposed segmental baffle plate secured to the inside of the shell wall adjacent the upper edge of said water outlet and well below the water level, and a substantially vertically disposed plate secured to the chordal edge of the segmental plate and forming a scale collecting pocket therewith.

6. A water, steam and scale separator for use in a water circulating system which includes supply means adapted to maintain water within the system and a column of water within the separator at a preselected level, said separator comprising a substantially vertically disposed cylindrical shell which is closed at both ends, an inlet conduit for water and steam extending into the upper portion of the shell above the water level therein, a curved baffle plate spaced from the inside of the cylindrical wall of the shell and extending across the end of said inlet conduit to direct water along the inside of the shell wall, a steam outlet at the top of the shell, a water outlet extending from the lower portion of the shell well below the water level therein, a substantially horizontally disposed segmental baffle plate secured to the inside of the shell wall adjacent the upper edge of the water outlet and well below the water level, a substantially vertically disposed plate secured to the chordal edge of the segmental plate and forming a scale collecting pocket therewith, and a second substantially horizontally disposed segmental plate secured to the shell wall adjacent the lower edge of said water outlet.

7. A water, steam and scale separator for use in a water circulating system which includes supply means adapted to maintain water within the system and a column of water at a preselected level within the separator, said separator comprising a substantially vertically disposed cylindrical shell which is closed at both ends, an inlet conduit for water and steam extending into the upper portion of said shell well above the water level therein, a curved baffle plate secured to the inner surface of the shell wall in spaced parallel relation therewith and extending across the end of said inlet conduit and beyond it in both directions to form openings from the conduit into the interior of the shell oppositely directed along the inside wall of said shell, a steam outlet at the top of the shell, a water outlet extending from the lower portion of said shell well below the water level therein, a substantially horizontally disposed segmental baffle plate secured to the inside of said shell below the water level and adjacent the upper edge of the water outlet, and a substantially vertically disposed plate secured to the chordal edge of the segmental plate and forming a scale collecting pocket therewith.

8. A water, steam and scale separator for use in a water circulating system which includes supply means adapted to maintain water within the system and a column of water at a preselected level within the separator, said separator comprising a substantially vertically disposed cylindrical shell which is closed at both ends, an inlet conduit for water and steam extending into the upper portion of the shell well above the water level therein, a curved baffle plate secured to the inner surface of the shell in spaced parallel relationship thereto and extending across the end of said inlet conduit and beyond it in both directions to form openings from the conduit into the interior of the shell oppositely directed along the inside of the shell wall, a steam outlet at the top of the shell, a water outlet extending from the lower portion of the shell well below the water level therein, a substantially horizontally disposed segmental baffle plate secured to the inside of the shell adjacent the upper edge of the water outlet and well below the water level, a substantially vertically disposed plate secured to the chordal edge of the segmental plate and forming with it a pocket to collect scale, and a second substantially horizontally disposed segmental baffle plate secured to said shell adjacent the lower edge of the water outlet.

9. A water, steam and scale separator for use in a water circulating system which includes supply means adapted to maintain water within the system and a column of water at a preselected level within the separator, said separator comprising a substantially vertically disposed cylindrical shell which is closed at both ends, an inlet conduit for water and steam extending into the upper portion of said shell above the water level therein, a curved baffle plate secured to the inner surface of the shell in spaced relationship therewith and extending across the end of said inlet conduit and beyond it in both directions to form openings from the conduit into the interior of the shell oppositely directed along the inside of the shell wall, a steam outlet at the top of the shell, a water outet extending from the lower portion of the shell well below the water level therein, and baffle means secured to the shell wall below the water level and adjacent the water outlet to prevent egress of scale.

10. A water, steam and scale separator for use in a water circulating system which includes supply means adapted to maintain water within the system and a column of water at a preselected level within the separator, said separator comprising a substantially vertically disposed cylindrical shell which is closed at both ends, an inlet conduit for water and steam extending into the upper portion of the shell above the water level therein, a curved baffle plate, spacing plates secured to the shell and to the baffle plate at its upper and lower edges to hold the said baffle plate in spaced parallel relationship with the inner surface of the shell wall, said baffle plate extending across the end of said inlet conduit and beyond it in both directions to form openings from the conduit into the interior of the shell oppositely directed along the inside of the shell wall, a steam outlet at the top of the shell, a water outlet extending from the lower portion of the shell well below the water level therein, and baffle means secured to the shell wall below the water level and adjacent said water outlet to prevent egress of scale.

11. A water, steam and scale separator for use in a water circulating system which includes supply means adapted to maintain water within the system and a column of water at a preselected level within the separator, said separator comprising a substantially vertically disposed cylindrical shell which is closed at both ends, an inlet conduit for water and steam extending into the upper portion of said shell above the water level therein, a curved baffle plate secured to the inner surface of the shell wall in spaced parallel relationship therewith and extending across the end of said inlet conduit and beyond it in both directions to form openings from the conduit into the interior of the shell oppositely directed along the inside of the shell wall, a second curved baffle plate secured in spaced parallel relationship with the inner surface of the shell wall diametrically opposite the first curved baffle plate, a steam outlet at the top of the shell, a water outlet extending from the lower portion of the shell wall below the water level therein, and baffle means secured to the inside of the shell wall adjacent the water outlet to prevent egress of scale.

12. A water, steam and scale separator for use in a water circulating system which includes supply means adapted to maintain water within the system and a column of water at a preselected level within the separator, said separator comprising a substantially vertically disposed cylindrical shell which is closed at both ends, an inlet conduit for water and steam extending into the upper portion of said shell above the water level therein, a curved baffle plate secured to the inner surface of the shell wall in spaced parallel relationship therewith and extending across the end of said inlet conduit and beyond it in both directions to form openings from the conduit into the interior of the shell oppositely directed along the shell wall, a second curved baffle plate secured in spaced parallel relationship with the inner surface of the shell wall diametrically opposite the first baffle plate, said second curved baffle plate extending downwardly within the shell below the water level therein, and a plate closing the space between the bottom of said second curved baffle plate and the shell wall, a steam outlet at the top of the shell, a water outlet extending from the lower portion of the shell well below the water level therein, and baffle means secured to the inside of the shell wall adjacent the water outlet and beneath the water level to prevent egress of scale.

13. A water, steam and scale separator for use in a water circulating system which includes supply means adapted to maintain water in the system and a column of water at a preselected level within the separator, said separator comprising a substantially vertically disposed cylindrical shell which is closed at both ends, an inlet conduit for water and steam extending into the upper portion of the shell above the water level therein, a curved baffle plate spaced from the inside of the shell wall and extending across the end of said inlet conduit to direct the water along the inside of the shell wall, a steam outlet at the top of the shell, a water outlet extending from the lower portion of said shell well below the water level therein, and baffle means secured to the inside of the shell wall adjacent said water outlet to prevent egress of scale.

JOHN P. TYSKEWICZ.

References Cited in the file of this patent

UNITED STATES PATENTS

| Number | Name | Date |
| --- | --- | --- |
| 2,511,351 | Laidley | June 13, 1950 |
| 2,539,019 | Hill | Jan. 23, 1951 |
| 2,547,190 | Wilson | Apr. 3, 1951 |